United States Patent [19]

Holzwarth

[11] 4,300,315
[45] Nov. 17, 1981

[54] VEHICLE PLASTIC DOOR CONSTRUCTION

[75] Inventor: Robert W. Holzwarth, Kalamazoo, Mich.

[73] Assignee: The Model A and Model T Motor Car Reproduction Corp., Wixom, Mich.

[21] Appl. No.: 80,001

[22] Filed: Sep. 28, 1979

[51] Int. Cl.³ .............................................. E06B 3/00
[52] U.S. Cl. ........................................ 49/501; 49/502; 49/503
[58] Field of Search .......................... 49/501, 502, 503

[56] References Cited

U.S. PATENT DOCUMENTS

| | | | |
|---|---|---|---|
| 2,760,814 | 8/1956 | Watter | 49/502 |
| 3,370,384 | 2/1968 | Hafer et al. | 49/502 |
| 3,718,364 | 2/1973 | Fischer et al. | |
| 3,782,036 | 1/1974 | Clark et al. | 49/502 |
| 3,829,149 | 8/1974 | Stevens | |
| 3,868,141 | 2/1975 | Johnson | 49/502 X |
| 4,013,317 | 3/1977 | Keidelbach et al. | |

FOREIGN PATENT DOCUMENTS

| | | | |
|---|---|---|---|
| 2016046 | 10/1971 | Fed. Rep. of Germany | 49/501 |
| 2410228 | 9/1974 | Fed. Rep. of Germany | 49/502 |

Primary Examiner—Kenneth Downey
Attorney, Agent, or Firm—Hiram P. Settle

[57] ABSTRACT

A vehicle door formed primarily from plastic material and a structure for reinforcing the door is disclosed. The door of the present invention includes a metal reinforcing beam extending longitudinally from an upper hinge support at a first end to a door latch at a second end. The beam has a hollow box like cross section and is affixed an inner surface of a door outer wall. A first end of the beam includes an upper hinge support, and a second end of the beam includes a latch support.

1 Claim, 5 Drawing Figures

VEHICLE PLASTIC DOOR CONSTRUCTION

BACKGROUND OF THE INVENTION

I. Field of the Invention

The present invention relates to the field of vehicle doors. More particularly the present invention relates to the field of vehicle doors formed primarily from plastic material. Even more particularly the present invention relates to the field of vehicle doors formed primarily from plastic having a reinforcing beam extending longitudinally along an inner surface of an outer wall of the door from a hinge support at one end to a door latch at another end.

II. Prior Art Statement

In recent years their has been a deep concern by the public for the high cost of operating motor vehicles. One way of reducing the cost of operating motor vehicles is do reduce their fuel consumption. Fuel consumption for a motor vehicle is directly related to vehicle weight. The use of plastic doors in vehicles can substantially reduce the weight of the door, however the door must be stiffened to provide safety for the occupants of the vehicle and be met with full acceptance with the public. Examples of door reinforcing braces in the prior art are disclosed in U.S. Pat. Nos. 3,718,364; 3,829,149; 4,013,317; and 3,868,141. None of these United States Patents disclose a door brace extending longitudinally across an inside portion of the door having a hollow box like cross section. These United States Patents are relevant to the Applicant's invention in that they represent the closest prior art for utilizing a door brace to reinforce the door.

The aforementioned prior art, in the opinion of the Applicant and his Attorney, represents the closest prior art of which the Applicant and the Applicant's Attorney are aware.

SUMMARY OF THE INVENTION

The present invention, which will be described in greater detail substantially, comprises a vehicle door formed primarily from plastic material including a metal reinforcing beam extending longitudinally from a first end of the door to a second end of the door. The beam is affixed an inner surface of an outer wall of the door and includes an upper hinge support at a first end and a door latch support at a second end. The beam of the present invention has a box like construction with a rectangular cross section. A reinforcing grid made from a plurality of intersecting "U" shaped members is affixed to the inner surface with the open end of the "U" shaped members bonded to the inner surface using an adhesive having an elastic memory.

It is therefore a primarily object of the present invention to provide a new and improved light weight vehicle door.

It is a further object of the present invention to provide such a door which includes a beam extending longitudinally across an inner surface of the door.

It is yet another object of the present invention to provide a vehicle door which includes, in addition to the beam, a reinforcing grid affixed an inner surface of the door.

It is yet another object of the present invention to provide an improved vehicle door made essentially of plastic wherein the beam and the reinforcing grid are bonded to an inner surface of the door utilizing an adhesive having an elastic memory.

It is yet a further object of the present invention to provide a vehicle door made essentially of plastic wherein the door panel and its reinforcing members may deflect under load and return to the original shape without breaking the adhesive bond.

For a more complete understanding of the present invention, reference is made to the following detailed description and accompanying drawings.

Other objects, advantages, and applications of the present invention will become apparent to those skilled in the field to which this invention pertains, when the accompanying description of the best modes contemplated for practicing the invention are read in conjunction with the accompanying drawings.

BRIEF DESCRIPTION OF THE DRAWINGS

In the drawings, like reference numbers refer to like parts throughout the several views, and wherein.

DESCRIPTION OF THE PREFERRED EMBODIMENT

Figure 1:
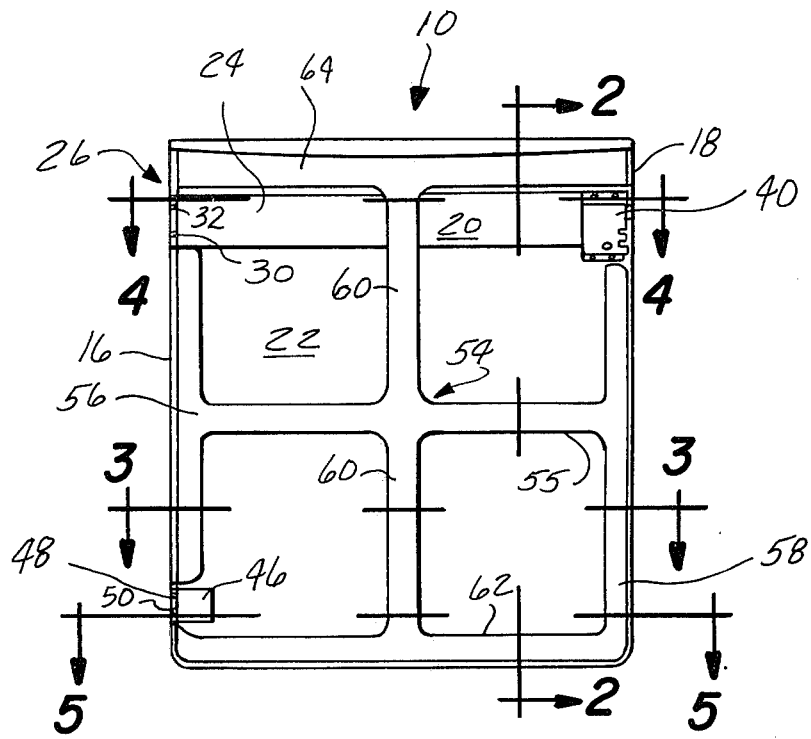
FIG. 1 illustrates a side view of the inside portion of the door of the present invention.
Figure 2:
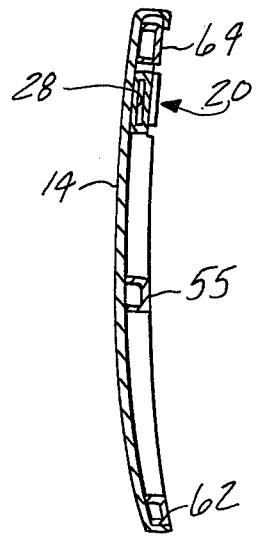
FIG. 2 illustrates a cross sectional view taken along the line 2—2 of FIG. 1.
Figure 3:
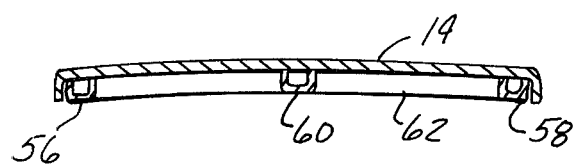
FIG. 3 illustrates a cross sectional view of the door of the present invention taken along the line 3—3 of FIG. 1.
Figure 4:
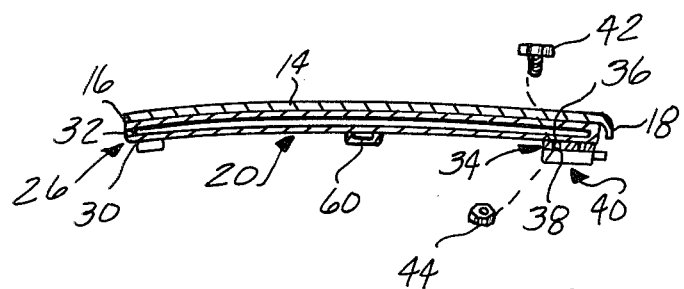
FIG. 4 illustrates a cross sectional view of the door of the present invention taken along the line 4—4 of the present invention.
Figure 5:
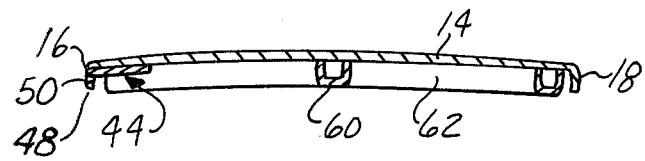
FIG. 5 illustrates a cross sectional view of the door of the present invention taken along the line 5—5 of FIG. 1.

Referring now to FIG. 1 of the drawing, there is illustrated at 10 one example of the present invention in the form of a door 12. The door 12 is formed primarily from plastic material such as glass filled epoxy commonly known as fiber glass and includes an outer wall 14 with a first end 16 and a second end 18. The door 10 further comprises a metal reinforcing beam 20 which extends longitudinally from the first end to the second end and includes an upper hinge support at the first end and a latch support at the second end. The beam 20 is affixed an inner surface 22 of the outer wall 14 by a suitable adhesive having an elastic memory such as polyester or polyurethane foam. The use of an adhesive having an elastic memory allows the outer wall 14 and the beam 20 to deflect under load and return to their original shape without disturbing the adhesive bond.

A first end of the beam 24 includes an upper hinge support 26 which is formed from a wall 28 of the beam 20 which abuts the inner surface 22 and extends to the first end 16 and is then bent inward forming an upper flange 30. The upper flange 30 includes one or more upper hinge mounting apertures 32 which are employed in conjunction with a threaded fastener (not shown) and a nut (not shown) for attaching a door hinge (not shown). A second end of the beam 34 includes a plurality of aperatures 36 formed therein which are aligned with a plurality of apertures 38 formed in a flange of a latch mechanism 40. A plurality of threaded fasteners 42 engage the aligned apertures 36, 38, and a plurality of nuts 44 threadingly engage the threaded fasteners 42 to secure the latch 40 to the beam 20, defining a latch support.

A lower hinge support 44 comprises a planar member 46 affixed the inner surface 22 and extending to the first end where the planar member is then bent inward a distance to form a lower flange 48. The lower flange 48 includes one or more hinge mounting apertures 50 formed therein which are employed to affix a door hinge (not shown) thereto.

The door 12 is further stiffened by a reinforcing grid 52 which comprises a "U" shaped perimeter member 54 extending around a perimeter of the door, the grid further including a "U" shaped horizontal member 55 extending between a first vertical portion 56 of the perimeter member and a second vertical portion 58 of the perimeter member. A vertical member 60 having a "U" shape cross section extends between a lower perimeter portion 62 and the horizontal member 55 and between the horizontal member 55 and an upper perimeter portion 64. All parts of the reinforcing grid 52 are interconnected to form an integral structure and the reinforcing grid 52 is bonded to the inner surface 22 with the open end of the "U" shaped cross section facing the inner surface 22. The grid 52 is bonded to the inner surface 22 using an adhesive having an elastic memory such as polyester or polyurethane foam. The first vertical portion 56 is interrupted at the upper hinge suport 26 and the lower hinge support 44 to allow the hinge support to project to the first end 16. The second vertical portion 58 is interrupted at the latch mechanism 40 to allow the latch mechanism to project to the second end. The use of an adhesive having an elastic memory to attach the reinforcing grid 52 to the outer wall 14 allows the outer wall 14 and the grid to deflect under load and return to their original shape when the load has been removed without destroying the adhesive bond between the grid 52 and the outer wall 14.

It can thus be a seen that the present invention has provided a new and improved plastic door for vehicles that substantially improves the safety of the occupants of the vehicle, yet reduces vehicle weight and improves the vehicle fuel consumption. The door reinforcing of the present invention allows the door to deflect under load and return to its original shape when the load has been removed without destroying the adhesive bond between the reinforcing members and the door panel.

It should be understood by those skilled in the art of vehicle doors that other forms of the Applicant's invention may be had, all coming within the spirit of the invention and scope of the appended claims.

Having thus described my invention what I claim is:

1. An automotive door construction comprising a rectangualr outer door panel formed of fiber reinforced plastic and haiving an in-turned flange about the perimeter thereof, an interior rectangular fiber reinforced plastic reinforcing grid fitted snugly within the peripheral flange and including horizontal upper, medial and lower sections, vertical edge sections and a vertical medial section, the grid sections each being "U"-shaped in cross-section and having their open ends contacting the inner surface of said panel, means securing said grid to the interior surface of said outer door panel, and a linear, horizontal, metallic beam of appreciable vertical extent secured to the panel inner surface intermediate the horizontal upper and medial sections of said reinforcing grid, said beam extending completely across said panel from a hinge support portion at one vertical edge of the panel to a latch support portion at the other end of said panel, the grid vertical sections and the vertical edge portions of said in-turned flange being interrupted by said beam to accommodate the extension of said beam from one vertical extremity of said door panel to the other vertical extremity of said door panel.

* * * * *